(12) United States Patent
Lv et al.

(10) Patent No.: US 10,352,467 B2
(45) Date of Patent: Jul. 16, 2019

(54) DIRECT-ACTION-TYPE ELECTRICALLY-OPERATED VALVE AND ASSEMBLY METHOD THEREFOR

(71) Applicant: Zhejiang Sanhua Co., Ltd., Zhejiang (CN)

(72) Inventors: Ming Lv, Zhejiang Province (CN); Xianrang Wei, Zhejiang Province (CN)

(73) Assignee: Zhejiang Sanhua Climate and Appliance Controls Group Co., Ltd, Shaoxing, Zhejiang (CN)

( * ) Notice: Subject to any disclaimer, the term of this patent is extended or adjusted under 35 U.S.C. 154(b) by 107 days.

(21) Appl. No.: 14/917,254

(22) PCT Filed: Jan. 20, 2015

(86) PCT No.: PCT/CN2015/071065
§ 371 (c)(1),
(2) Date: Mar. 7, 2016

(87) PCT Pub. No.: WO2015/106724
PCT Pub. Date: Jul. 23, 2015

(65) Prior Publication Data
US 2016/0195195 A1 Jul. 7, 2016

(30) Foreign Application Priority Data

Jan. 20, 2014 (CN) .......................... 2014 1 0025331
Jan. 20, 2014 (CN) .......................... 2014 1 0026132

(51) Int. Cl.
*F16K 31/04* (2006.01)
*F16K 31/50* (2006.01)
(52) U.S. Cl.
CPC .......... *F16K 31/047* (2013.01); *F16K 31/508* (2013.01)

(58) Field of Classification Search
CPC .......... F16K 31/02; F16K 31/50; F16K 27/00; F16K 31/53; F16K 31/04; F16K 31/047; F16K 31/508
See application file for complete search history.

(56) References Cited

U.S. PATENT DOCUMENTS 4,071,041 A * 1/1978 Moran, Jr. .............. F16K 5/201
137/246.22
4,723,753 A  2/1988 Torimoto et al.
(Continued)

FOREIGN PATENT DOCUMENTS

CN      1985118 A      6/2007
CN    201916532 U      8/2011
(Continued)

OTHER PUBLICATIONS

Machine translation of CN 203223617.*
(Continued)

*Primary Examiner* — Kevin F Murphy
*Assistant Examiner* — Patrick C Williams
(74) *Attorney, Agent, or Firm* — Wolf, Greenfield & Sacks, P.C.

(57) ABSTRACT

A direct-action-type electrically-operated valve comprises a valve base provided with a valve cavity, a motor disposed on the upper end the valve base, and a screw rod. The screw rod is fitted and connected to a nut by means of threads. The nut is connected to a spool. Axial positions of a rotor of the motor and the valve base are relatively fixed. The upper end of the screw rod is fixedly connected to the rotor. Driven by the nut, the spool moves along the axial direction of the valve cavity to open or close a valve opening disposed on the valve base. The spool is a tubular structure provided with a (Continued)

balancing channel, and a seal piece for dividing the valve cavity into two independent cavities is disposed on the periphery of the spool.

1 Claim, 11 Drawing Sheets

(56) References Cited

U.S. PATENT DOCUMENTS

| | | | | |
|---|---|---|---|---|
| 5,060,910 | A * | 10/1991 | Iwata | F16K 31/04 |
| | | | | 251/129.05 |
| 6,460,567 | B1 * | 10/2002 | Hansen, III | F16K 31/04 |
| | | | | 137/554 |
| 6,561,480 | B1 | 5/2003 | Komiya et al. | |
| 7,240,694 | B2 * | 7/2007 | Johnsen | F16K 1/10 |
| | | | | 137/630.15 |
| 8,047,750 | B2 * | 11/2011 | Mochizuki | B23B 31/265 |
| | | | | 384/126 |
| 8,851,448 | B2 * | 10/2014 | Harada | F16K 31/04 |
| | | | | 251/129.11 |
| 2006/0005890 | A1 | 1/2006 | Johnsen et al. | |
| 2013/0207014 | A1 | 8/2013 | Nissen et al. | |
| 2015/0136260 | A1 | 5/2015 | Zhan | |

FOREIGN PATENT DOCUMENTS

| | | |
|---|---|---|
| CN | 202109047 U | 1/2012 |
| CN | 203009981 U | 6/2013 |
| CN | 203082326 U | 7/2013 |
| CN | 203223617 U | 10/2013 |
| CN | 103388939 A | 11/2013 |
| DE | 512 667 C | 11/1930 |
| JP | 2000179731 A | 6/2000 |
| JP | 2000-346225 A | 12/2000 |
| JP | 2001-221359 A | 8/2001 |
| JP | 2003-185302 A | 7/2003 |
| JP | 2003-286843 A | 10/2003 |
| JP | 2006010004 A | 1/2006 |
| JP | 2008-505293 A | 2/2008 |
| JP | 2008267464 A | 11/2008 |
| JP | 2011-153632 A | 8/2011 |
| JP | 2012013197 A | 1/2012 |
| JP | 2013-87892 A | 5/2013 |

OTHER PUBLICATIONS

Chinese Office Action, dated Sep. 2, 2016 from related Chinese Patent Application No. 201410026132.1.
Chinese Office Action, dated Nov. 2, 2016, from related Chinese Patent Application No. 201410025331.0.
Extended European Search Report in connection with Application No. EP 15737429.9 dated Jul. 21, 2017.
International Search Report, dated Apr. 8, 2015, from corresponding International Application No. PCT/CN2015/071065.
Japanese 1$^{st}$ Office Action for Application No. JP 2016-524052 dated Apr. 11, 2017.
Extended European Search Report dated Jun. 4, 2018 in connection with European Application No. 18157478.1.
Japanese Office Action dated Sep. 11, 2018 in connection with Japanese Application No. 2017-186257.

* cited by examiner

DIRECT-ACTION-TYPE ELECTRICALLY-OPERATED VALVE AND ASSEMBLY METHOD THEREFOR

This application claims the benefit of priorities to Chinese Patent Application No. 201410026132.1 titled "DIRECT-ACTING ELECTRIC VALVE", filed with the Chinese State Intellectual Property Office on Jan. 20, 2014, and Chinese Patent Application No. 201410025331.0 titled "DIRECT-ACTING ELECTRIC VALVE AND ASSEMBLY METHOD THEREFOR", filed with the Chinese State Intellectual Property Office on Jan. 20, 2014, the entire disclosures of which are incorporated herein by reference.

TECHNICAL FIELD

The present application relates to the technical field of fluid control components, and particularly to a direct-acting electric valve. In addition, the present application further relates to an assembly method for assembling the direct-acting electric valve.

BACKGROUND

In commercial air conditioners, such as multi-air conditioner or modular air conditioners, one outdoor unit system is connected with multiple indoor unit systems, and a flow control valve is required to be mounted in a refrigerant loop of each indoor unit for cutting off refrigerant or adjusting the flow. The flow control valve is required to be capable of being adjusted to any opening degree and acting stably. Further, since the refrigerant loop of each indoor unit needs one flow control valve, the flow control valve is required to meet the requirement of minimization and large-capacity.

Currently, the flow control valve is generally a pilot control valve, and a valve core of the pilot valve is powered by a motor, and a main valve port is opened or closed by a main valve core and a valve core of the pilot valve cooperatively. However, when the pilot control valve opens the main valve port, the opening area is increased sharply, thus the flow changes sharply. That is to say, the pilot control valve cannot adjust the flow precisely.

For precisely adjusting the flow of the refrigerant, a direct-acting control valve may be employed. In a conventional direct-acting control valve, a screw rod is connected to and driven by an output shaft of a motor via a gear system, and the screw rod is cooperated with a nut by screw threads. The nut is connected with a valve core and is limited in position to allow the nut to be slidable along an axial direction of the screw rod but unable to be rotated in a circumferential direction of the screw rod. In operation, the motor starts, and an output shaft of the motor rotates, and the rotation is transmitted to the screw rod via the gear system, and with the rotation of the screw rod, the nut slides in the axial direction, which allows the valve core to slide in the axial direction, and further achieves the purpose of adjusting an opening degree of the valve port.

Since in the commercial air-conditioners such as multi-air conditioner or modular air conditioners, the area of the valve port of the flow control valve is required to be large, thus requiring a large driving force, and if the direct-acting control valve is adopted, a large size motor must be used for acquiring the large driving force, thus, the size of the control valve is excessively large, thus, not only the cost is increased, but also mounting and detaching are inconvenient.

In another kind of conventional direct-acting control valve, a screw rod is fixed to a rotor of a motor, and is cooperated with a nut by screw threads, and a lower end of the screw rod is directly cooperated with a valve core, and the nut is fixed to a valve seat. In operation, the screw rod is rotated by the rotor of the motor, and since the screw rod is cooperated with the nut by screw threads and the nut is fixed, the screw rod may further be moved axially by the rotor, thus further allowing a valve core to open or close the valve port. However, when this kind of direct-acting control valve operates, the position of the rotor changes with respect to an axial center of the coil component due to an axial motion of the rotor, thus the rotor cannot be kept at the axial center of the coil component, which further reduces the driving force, and also. The size of the motor is also required to be increased for opening and closing a valve port with a large diameter.

In view of this, a technical issue to be addressed by those skilled in the art presently is to improve a direct-acting control valve, through which a valve port with a large diameter can be opened and closed by a small-sized motor.

SUMMARY

An object of the present application is to provide a direct-acting electric valve, through which a valve port with a large diameter can be opened and closed by a small-sized motor, thereby meeting the requirement of minimization and large capacity.

For addressing the technical issues, a direct-acting electric valve is provided according to the present application, which includes a valve seat provided with a valve cavity, a motor arranged at an upper end of the valve seat, and a screw rod. The screw rod is cooperated with and connected to a nut by means of screw threads, and the nut is connected to a valve core. Axial positions of a rotor of the motor and the valve seat are fixed with respect to each other, and an upper end of the screw rod is fixedly connected to the rotor, and the valve core is movable axially in the valve cavity as the nut moves, so as to open or close the valve port arranged on the valve seat. The valve core is a column structure with an balancing passage, and a sealing member, which separates the valve cavity into two independent cavities, is provided outside a circumferential surface of the valve core.

As designed above, in operation, the rotor is rotated by the coil component of the motor. Since the axial positions of the rotor and the valve seat are fixed and the screw rod is fixedly connected to the rotor, only the screw rod is rotated by the rotor. The nut cooperated with the screw rod by screw threads converts the rotation of the screw rod to the axial movement, thus moving the valve core axially, so as to open or close the valve port. The above structure dispenses the gear system, reduces unnecessary transmission, thereby reducing the power loss, and giving a direct, reliable and sensitive response. Further, the axial positions of the rotor and the valve seat are fixed with respect to each other, i.e., the relative position between the rotor and the coil component in operation is fixed, thus, the driving force provided by the motor will not change along with the axial moving of the valve core. In addition, the valve core has an balancing passage. When opening the valve, the valve core suffers a small resistance. Apparently, for the valve port with a same size, the size of the motor in this solution is smaller than the size of the motor in the conventional technology, which meets the requirement of minimization and large capacity to the valve body.

The axial positions of the rotor of the motor and the upper valve seat are fixed with respect to each other, and the screw rod is fixedly connected to the rotor, thus, in operation, the screw rod is rotated by the motor directly, and the nut cooperated with the screw rod by screw threads converts the rotation of the screw rod into an axial movement, thereby moving the valve core axially, so as to open or close the valve port, which dispenses the gear system, and reduces unnecessary transmission, and has a small power loss, and a direct and reliable response.

The axial positions of the rotor of the motor and the upper valve seat are fixed with respect to each other, such that the relative position between the rotor and the coil component of the motor is fixed, thus, in operation, a driving moment of the motor will not change along with an axial movement of the valve core, which, in conjunction with the above description, can effectively reduce the size of the motor.

Preferably, the screw rod is fixed to the rotor via an annular connecting sheet by welding; and a peripheral edge of a through hole of the annular connecting sheet extends axially to form a protrusion.

Preferably, the rotor is a permanent magnet rotor, and the ratio of an outer diameter of the rotor to the diameter of the valve port ranges from 0.8 to 1.8.

Preferably, the nut includes a small diameter portion cooperated with the screw rod by screw threads and a large diameter portion, and an upper end of the valve core is provided with a receiving cavity for receiving the large diameter portion of the nut, and an upper end of an inner wall of the receiving cavity is provided with an annular step having a stepped surface facing to the screw rod, and a nut cover plate is provided on the annular step, which restricts the relative position between the nut and the valve core in an axial direction.

Preferably, the balancing passage of the valve core includes the receiving cavity, an axial through hole in communication with the receiving cavity, and a vent groove arranged in a circumferential wall of the nut.

Preferably, a lower end of an inner wall of the axial through hole is provided with an annular groove, and a sieve is provided in the annular groove.

Preferably, a bottom end of the valve core is provided with an axial protrusion, and a sealing ring is riveted onto the axial protrusion, and in the case that the valve core is in a fully closed state, a lower end surface of the sealing ring fits against an end surface of the valve port to form a seal.

Preferably, an axial central line of the rotor is coincident with an axial central line of the coil component of the motor.

An assembly method for a direct-acting electric valve includes the following steps:

mounting an assembled valve core assembly to an assembled lower valve seat assembly;

screwing a screw rod of an assembled upper valve seat assembly into a nut of the valve core assembly, and fixing an upper valve seat of the upper valve seat assembly to a lower valve seat of the lower valve seat assembly by welding; and mounting a housing and a fixing rest by pressing, and assembling a coil component of a motor.

The direct-acting electric valve according to the present application employs the above assembling method for the direct-acting electric valve, since the direct-acting electric valve has the above technical effects, the assembling method for assembling the direct-acting electric valve should also have the corresponding technical effects.

Preferably, the assembling of the upper valve seat assembly includes the following steps:

mounting a screw rod, a bearing and an upper valve seat by pressing;

mounting a spacer to an upper end of the bearing, and riveting or welding the spacer to the upper valve seat;

clamping a bush between the screw rod and the spacer, which allows the bush to abut against an upper end of the bearing and be fixed to the screw rod by welding; and sleeving a rotor of a motor on an upper end of the upper valve seat, and fixedly connecting the rotor of the motor to the screw rod.

DETAILED DESCRIPTION

An object of the present application is to provide a direct-acting electric valve, through which a valve port with a large diameter can be opened and closed by a small-sized motor, thus meeting the requirement of minimization and large capacity.

For those skilled in the art to better understand the solutions of the present application, the present application is further described in detail with reference to drawings and embodiments.

It is noted that, the orientation terms referred herein are defined by the positions of the components in FIGS. 1 to 11 and the position relationship between the components, which is only for clarity and ease of description of the technical solutions. It should be appreciated that, the orientation terms used herein should not limit the protection scope of the present application.

Figure 1:
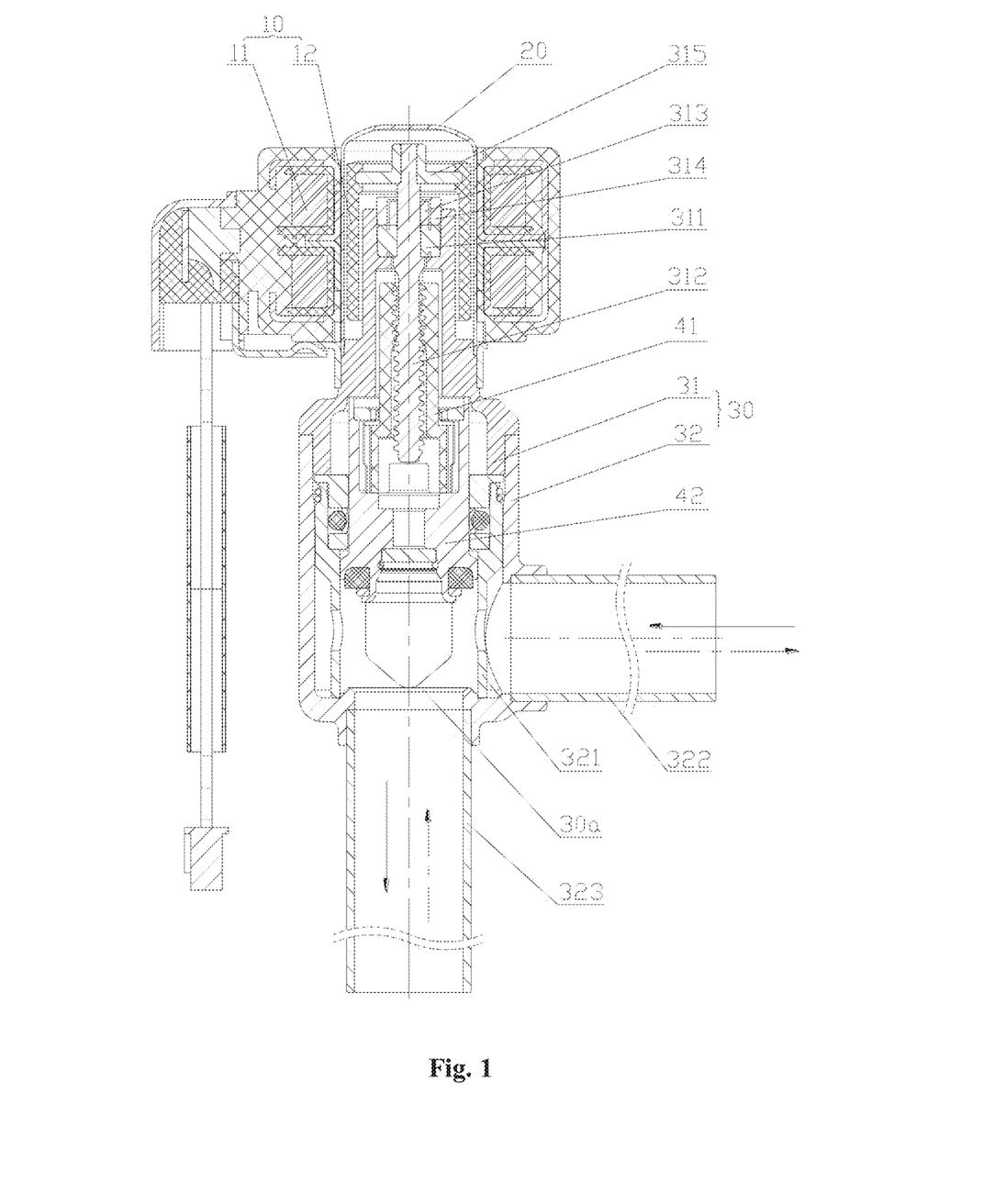
FIG. 1 is a sectional view of an embodiment of a direct-acting electric valve according to the present application, which shows a valve core is in a fully opened state.
Figure 2:
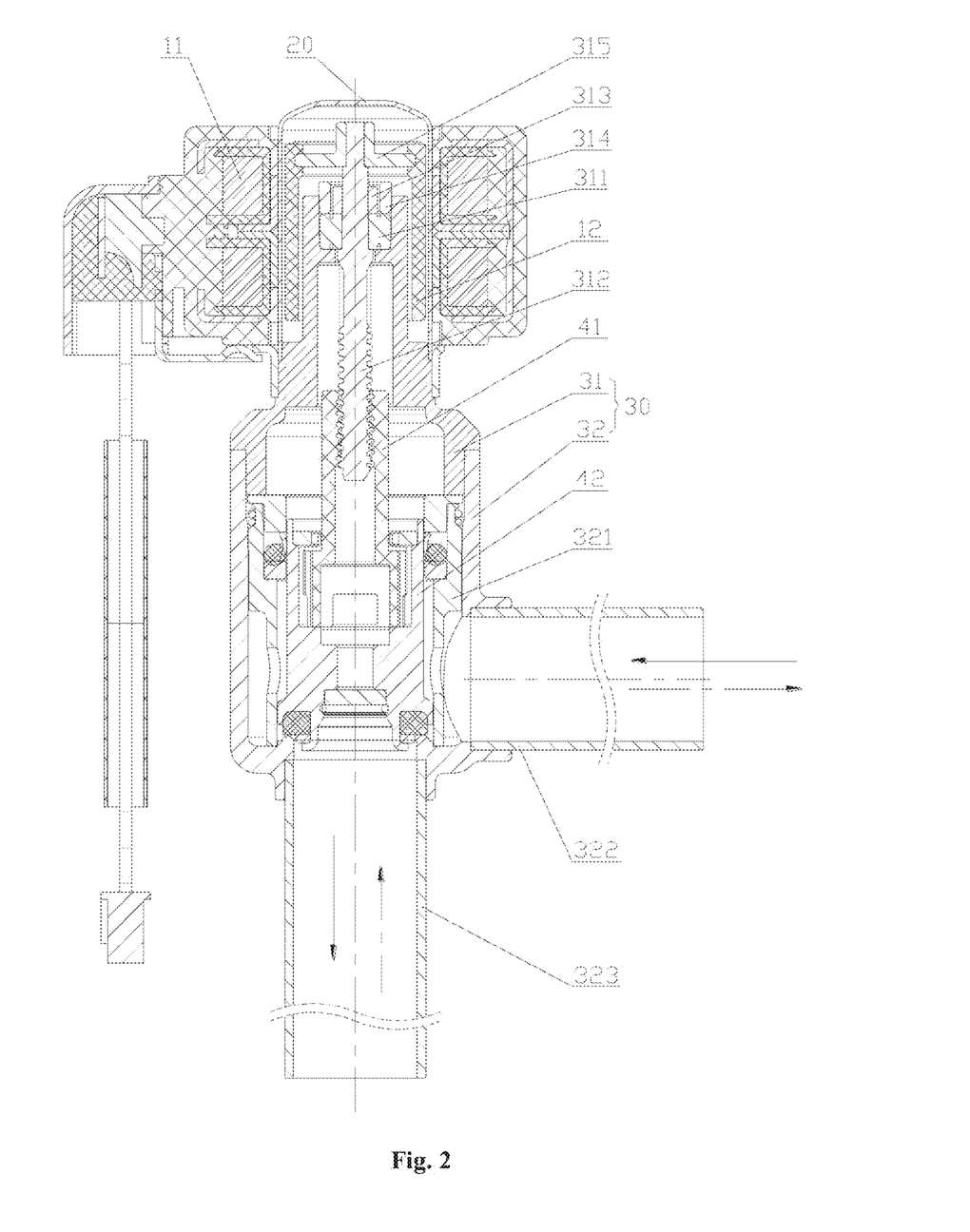
FIG. 2 is a sectional view of the embodiment of the direct-acting electric valve according to the present application, which shows the valve core is in a fully closed state.

Reference is made to FIGS. 1 and 2. FIG. 1 is a sectional view of an embodiment of a direct-acting electric valve according to the present application, which shows the structure of a valve core is in a fully opened state. FIG. 2 is a sectional view of the embodiment of the direct-acting electric valve according to the present application, which shows the structure of the valve core is in a fully closed state.

In the embodiment, a direct-acting electric valve includes a valve seat 30 with a valve cavity therein, a housing 20 connected to the valve seat 30, a motor 10 arranged at an upper end of the valve seat 30, and a screw rod 312. The screw rod 312 is connected to a nut 41 by means of screw threads, and the nut 41 is connected to a valve core 42. A rotor 12 of the motor 10 is arranged in the housing 20 and fixed in an axial direction of the valve seat 30. A coil component 11 is sleeved on the housing 20, and an upper end of the screw rod 312 is fixedly connected to the rotor 12, and the valve core 42 is movable in the axial direction of the valve cavity as t the nut 41 moves, so as to open or close a valve port 30a arranged on the valve seat 30. The valve core 42 is a cylindrical structure with an balancing passage, and a sealing member, which separates the valve cavity into two independent cavities, is provided outside the circumferential surface of the valve core 42.

The direct-acting electric valve includes a valve core assembly 400 and a lower valve seat assembly 302. The lower valve seat assembly 302 includes a lower valve seat 32 and a valve seat core 321 arranged in an inner cavity of the lower valve seat 32. The valve core assembly 400 includes a nut 41 and a valve core 42 connected to the nut 41. The direct-acting electric valve further includes an upper valve seat assembly 301, which includes an upper valve seat 31, a screw rod 312 and a rotor 12 of a motor 10. The upper valve seat 31 is fixedly connected to the lower valve seat 32, and the inner cavities of the upper valve seat 31 and the lower valve seat 32 are communicated with each other. The rotor 12 is sleeved on an upper end of the upper valve seat 31 and fixed in an axial direction of the upper valve seat 31. An upper end of the screw rod 312 passes through the upper valve seat 31 and is fixedly connected to the rotor 12, and a lower end of the screw rod 312 is cooperated with the nut 41 by screw threads. The valve core 42 is movable in an axial direction of a core cavity of the valve seat core 321 as the nut 41 moves, so as to open or close a valve port 32a arranged on the lower valve seat 32.

The direct-acting electric valve has following technical effects.

The axial positions of the rotor 12 of the motor 10 and the upper valve seat 31 are fixed with respect to each other, and the screw rod 312 is fixedly connected to the rotor 12, thus, in operation, the screw rod 312 is rotated by the motor 10 directly, and the nut 41 cooperated with the screw rod 312 by screw threads converts the rotation of the screw rod 312 into an axial movement, thereby allowing the valve core 42 to move axially and further opening or closing the valve port 32a, which dispenses the gear system, and reduces unnecessary transmission, and has a small power loss and a more direct and reliable response.

The axial positions of the rotor 12 of the motor 10 and the upper valve seat 31 are fixed with respect to each other, thus the relative position between the rotor 12 and the coil component 11 of the motor 10 is fixed, thus, in operation, a driving moment of the motor 10 will not change along with the axial movement of the valve core 42, which, in conjunction with the above description, can effectively reduce the size of the motor 10.

The housing 20 is sleeved on the upper valve seat 31, the coil component 11 of the motor 10 is sleeved on the housing 20, and is supported by a fixing rest 21 sleeved on the housing 20.

As designed above, in operation, the rotor 12 is rotated by the coil component 11 of the motor 10. Since the axial positions of the rotor 12 and the valve seat 30 are fixed, and the screw rod 312 is fixedly connected to the rotor 12, only the screw rod 312 is rotated by the rotor 12. The nut 41 cooperated with the screw rod 312 by screw threads converts the rotation of the screw rod 312 to the axial movement, thus allowing the valve core 42 to move axially and further opening or closing the valve port 30a. The above structure dispenses the gear system, reduces unnecessary transmission, thereby reducing the power loss, and has a direct, reliable and sensitive response. Further, the axial positions of the rotor 12 and the valve seat 30 are fixed with respect to each other, i.e., in operation, the relative position between the rotor 12 and the coil component 11 is fixed, thus, the driving force provided by the motor 10 will not change along with the axial moving of the valve core 42. Apparently, for the valve ports 30a with the same size, the size of the motor in this solution is smaller than the size of the motor in the conventional technology, which meets the requirement of minimization and large capacity of the valve body.

In a preferred solution, an axial central line of the rotor 12 is coincident with an axial central line of the coil component 11. In another preferred solution, axial central lines of the coil component 11, a bearing 311 and the rotor 12 are coincident with each other, thus allowing the driving force provided by the motor 10 to be maximized.

In this embodiment, the valve seat 30 includes the upper valve seat 31 and the lower valve seat 32 which are fixedly connected. The valve port 30a is arranged in the lower valve seat 32.

Figure 4:
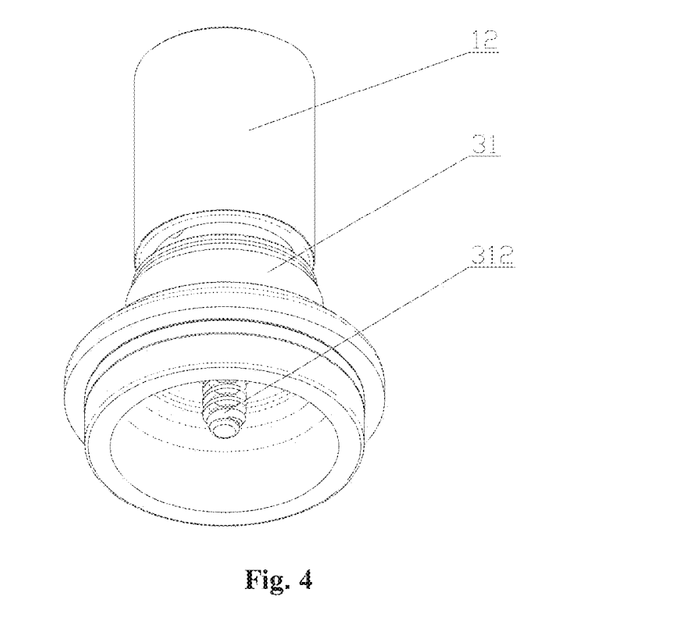
FIG. 4 is a schematic view showing the structure of an upper valve seat assembly in FIG. 1.
Figure 5:
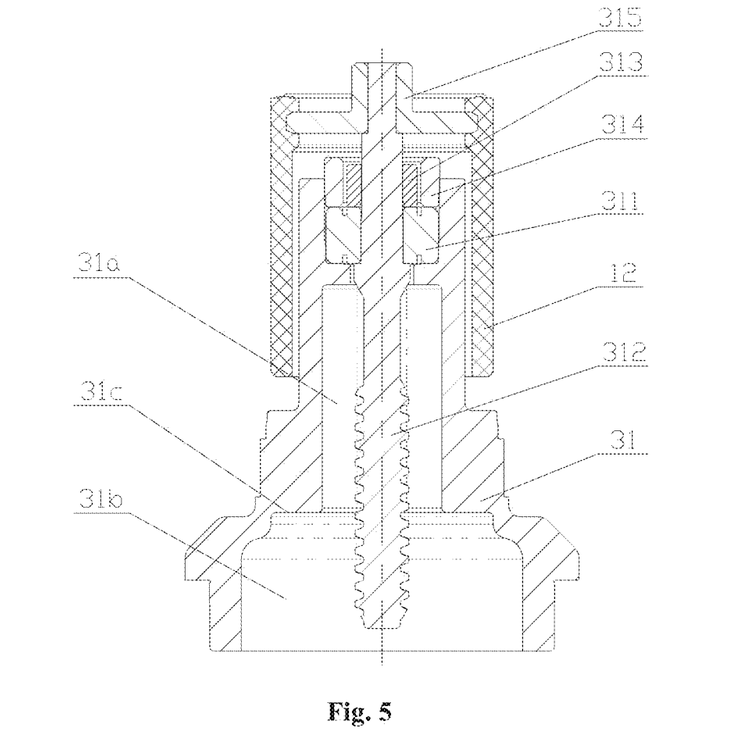
FIG. 5 is a sectional schematic view showing the upper valve seat assembly in FIG. 1.
Figure 6:
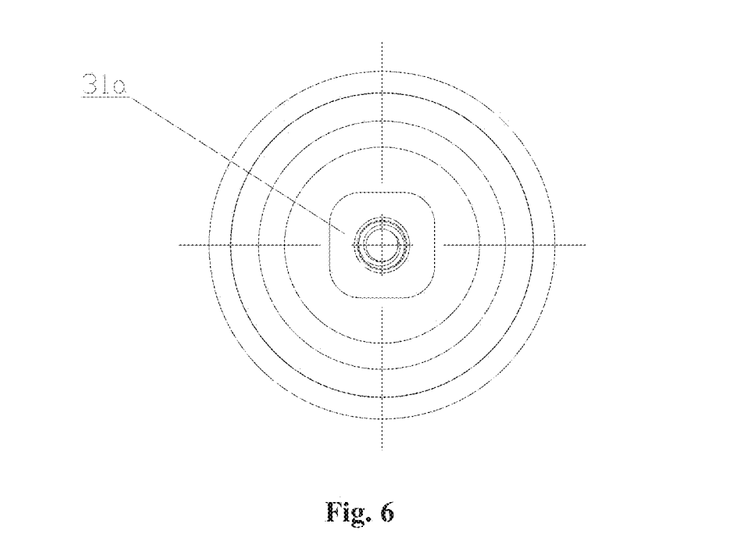
FIG. 6 is a top view of FIG. 5.

Reference is made to FIGS. 4 to 6. FIG. 4 is a schematic view showing the structure of an upper valve seat assembly in FIG. 1. FIG. 5 is a sectional schematic view showing the upper valve seat assembly in FIG. 1. FIG. 6 is a top view of FIG. 5.

As shown in the drawings, the upper valve seat 31 includes a small diameter segment inserted into the rotor 12 and a large diameter segment, and the screw rod 312 passes through the inner cavity of the upper valve seat 31 and is fixedly connected to the rotor 12.

In a specific solution, the screw rod 312 is fixed to the rotor 12 via an annular connecting sheet 315 by welding; and the annular connecting sheet 315 is in an annular shape with a middle through hole, and may be sleeved on the screw rod 312. An outer side of the annular connecting strip 312 is fixed to the rotor 12 by welding, which ensures the connecting strength of the screw rod 312 and the rotor 12.

Further, a peripheral edge of the through hole of the annular connecting sheet 315 extends axially to form a protrusion. Thus, the protrusion is sleeved on the screw rod 312, which may increase the contact area of the annular connecting sheet 315 and the screw rod 312, thereby increasing the connecting strength between the screw rod 312 and the rotor 12, and ensuring the screw rod 312 to be rotated by the rotor 12.

In the specific solution, the annular connecting sheet 315 and the rotor 12 may be an integral structure for facilitating the assembling.

The inner cavity of the upper valve seat 31 is separated by an annular plate into an upper cavity and a lower cavity, and the annular plate and the upper valve seat 31 may be integrated. A bearing 311 is provided in the upper cavity, and an inner ring of the bearing 311 fits against an outer circumferential surface of the screw rod 312, and an outer ring of the bearing 311 fits against an inner wall of the upper cavity. In this way, the axial positions of the screw rod 312 and the upper valve seat 31 are fixed with respect to each other via the bearing 311, thus the axial positions of the rotor 12 and the upper valve seat 31 are fixed with respect to each other, i.e., the relative position between the bearing 311, the screw rod 312 and the rotor 12 is fixed in the above described structure of the upper valve seat 31.

A circumferential wall of the upper valve seat 31 may further be provided with an balancing hole 31d, and the balancing hole 31d may be provided in the small diameter segment of the upper valve seat 31 for balancing the pressure and reducing the rotational resistance of the screw rod 312.

Further, an upper end of the bearing 311 is further provided with a bush 313, and the bush 313 is sleeved on the screw rod 312, and is fixed to the screw rod 312 by welding, which may prevent the inner ring of the bearing 311 from being disengaged from the outer ring of the bearing 311 due to an axial force. A spacer 314 may further be sleeved on the bush 313, and the spacer 314 may be welded to the upper end of the upper valve seat 31, which may further prevent the disengagement of the inner ring and the outer ring of the bearing 311 from each other.

The upper valve seat 31, the bearing 311, the screw rod 312 and the rotor 12 may be defined as the upper valve seat assembly.

It is to be noted that, the above description provides a way for axially positioning the rotor 12 and the valve seat 30 only as an example, and in practical, the axial positions of the rotor 12 and the valve seat 30 may also be fixed by other manners.

Figure 12:
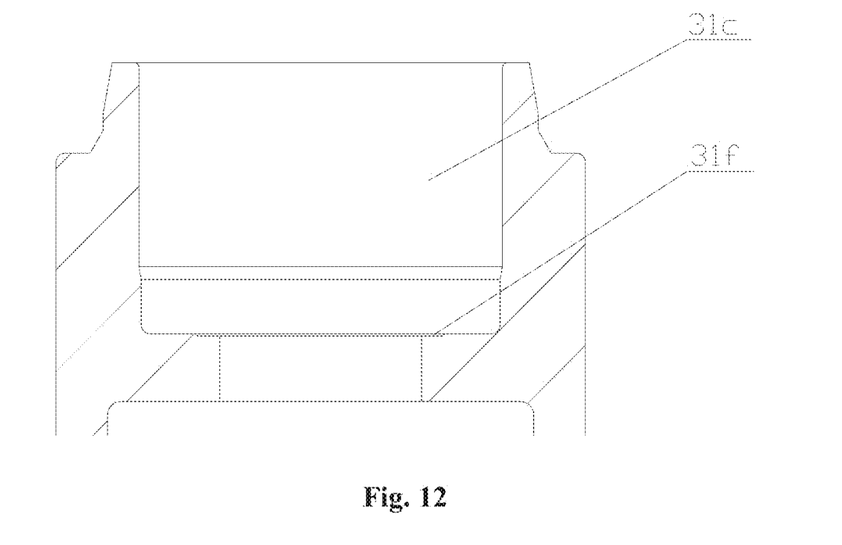
FIG. 12 is an enlarged schematic view showing an upper cavity of an upper valve seat.

As shown in FIG. 12, an upper end of the annular plate of the upper valve seat 31 is provided with an annular step 31f with a stepped surface facing to the bearing 311, which may prevent the inner ring of the bearing 311 from directly rubbing against the annular plate during the rotation.

A threaded segment of the screw rod 312 is located at a lower cavity of the upper valve seat 31, and the lower cavity includes a small diameter cavity 31a and a large diameter cavity 31b. The small diameter cavity 31a is configured to guide the nut 41 connected to the screw rod 312 by screw threads, and the large diameter cavity 31b is configured to cooperate with the inner cavity of the lower valve seat 32 so as to form the valve cavity. That is to say, the lower cavity of the upper valve seat 31 provides a space for the valve core assembly 400 consisting of the nut 41 and the valve core 42 to move axially. The structural arrangement of the upper valve seat 31 allows the axial size of the valve body to be reduced, and facilitates the minimization of the valve body.

Figure 7:
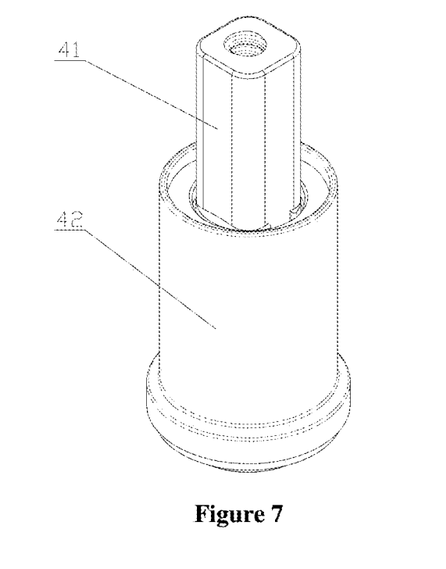
FIG. 7 is a schematic view showing the structure of a valve core assembly in FIG. 1.
Figure 8:
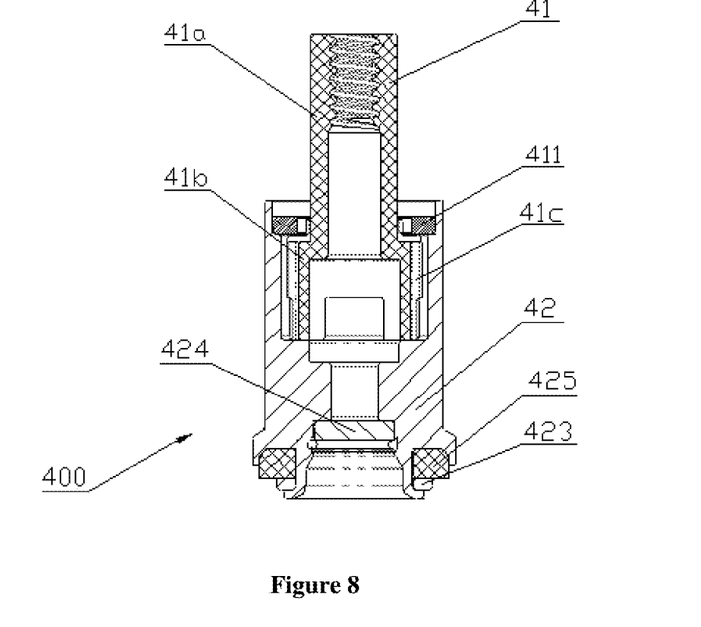
FIG. 8 is a sectional schematic view of the valve core assembly in FIG. 1.
Figure 9:
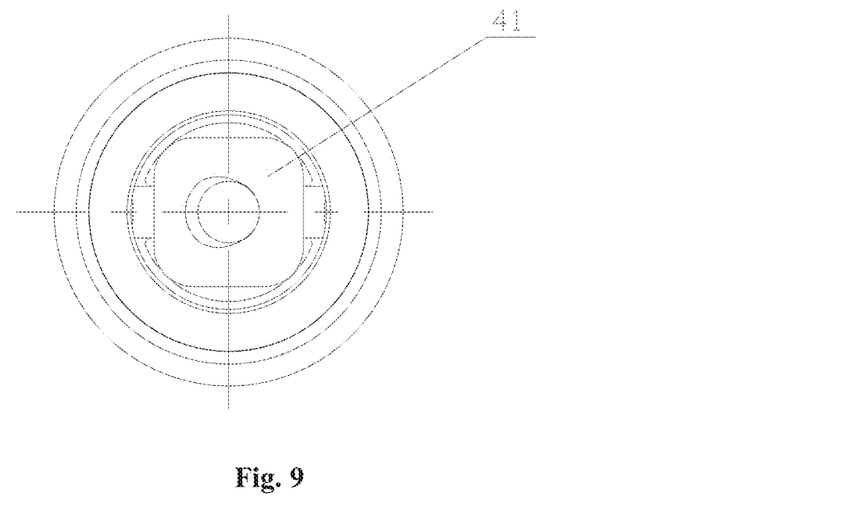
FIG. 9 is a top view of FIG. 8.

Reference is made to FIGS. 7 to 9. FIG. 7 is a schematic view showing the structure of the valve core assembly in FIG. 1. FIG. 8 is a sectional schematic view of the valve core assembly in FIG. 1. FIG. 9 is a top view of FIG. 8.

The valve core assembly 400 includes the nut 41 and the valve core 42. The nut 41 includes a small diameter portion 41a cooperated with the screw rod 312 by screw threads and a large diameter portion 41b. An upper end of the valve core 42 has a receiving cavity for receiving the large diameter portion 41b, and an upper end of an inner wall of the receiving cavity is provided with an annular step having a stepped surface facing to the rotor 12, and a nut cover plate 411 is provided on the annular step, which limits the relative position between the nut 41 and the valve core 42 in the axial direction.

When the rotor 12 rotates such that the screw rod 312 is rotated and the nut 41 is moved upward, the valve core 42 is move upward together with the nut 41 since an end portion of the large diameter portion 41b of the nut 41 interferes with the nut cover plate 411, which prevents the nut 41 from being disengaged from the valve core 42.

When the rotor 12 rotates such that the screw rod 312 is rotated and the nut 41 is moved downward, the nut 41 may directly push the valve core 42 to move downward together, till the valve port 30a is closed.

It is to be noted that, the rotor 12 of the motor 10 may be rotated clockwise or anticlockwise by the coil component 11, thus the nut 41 is moved upward or downward. In practical arrangement, it may be configured as follows: when the rotor 12 is rotated clockwise, the nut 41 is moved upward, and when the rotor 12 is rotated anticlockwise, the nut 41 is moved downward. Apparently, it may also be configured as follows: when the rotor 12 is rotated clockwise, the nut 41 is moved downward, and when the rotor 12 is rotated anticlockwise, the nut 41 is moved upward.

The small diameter portion 41a of the nut 41 protrudes into the small diameter cavity 31a of the lower cavity of the upper valve seat 31. The screw rod 312 allows the small diameter portion 41a of the nut 41 to be moved axially in the small diameter cavity 31a and the small diameter cavity 31a may guide the axial movement of the nut 41, thereby preventing the nut 41 from deviating in the axial movement, which adversely affects the sealing performance of the valve core 42 to the valve port 30a.

Apparently, for converting the rotation of the screw rod 312 to the axial movement and further move the valve core 42 axially via the nut 41, a position-limiting member is further provided for restricting a circumferential rotation of the nut 41.

The position-limiting member may be in various forms, and specifically in this solution, the small diameter portion 41a of the nut 41 may have a column structure with a non-circular cross section, for example, a square column shown in FIG. 7.

Correspondingly, the small diameter cavity 31a of the upper valve seat 31 matches with the square column. Apparently, in practical, the small diameter portion 41a of the nut 41 may also be as a column structure with other non-circular cross sections, for example, a pentagonal cross section, etc., and the small diameter cavity 31a matches with the small diameter portion 41a. The inner wall of the small diameter cavity 31a may also be provided with a retainer ring, and an inner hole of the retainer ring may have a non-circular shape, and the small diameter portion 41a of the nut 41 may be a column with a non-circular cross section in cooperation with the retainer ring. In addition, a circumferential position-limiting groove may further be provided at the bottom of the receiving cavity, and the bottom of the large diameter portion 41b of the nut 41 is correspondingly provided with a circumferential position-limiting protrusion in cooperation with the circumferential position-limiting groove. The above described is only as several examples of position-limiting members for restricting the circumferential rotation of the nut 41.

Figure 13:
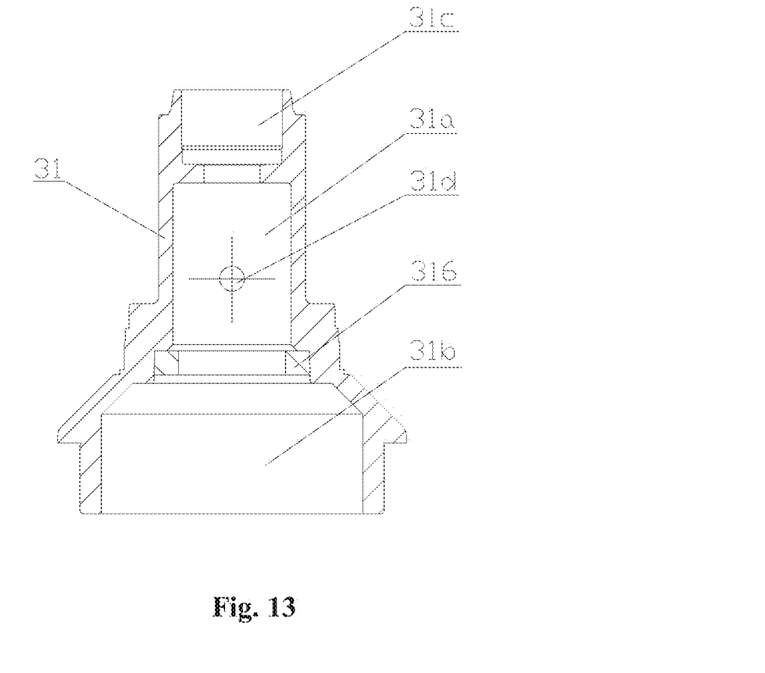
FIG. 13 is a schematic view showing the structure of the upper valve seat.
Figure 14:
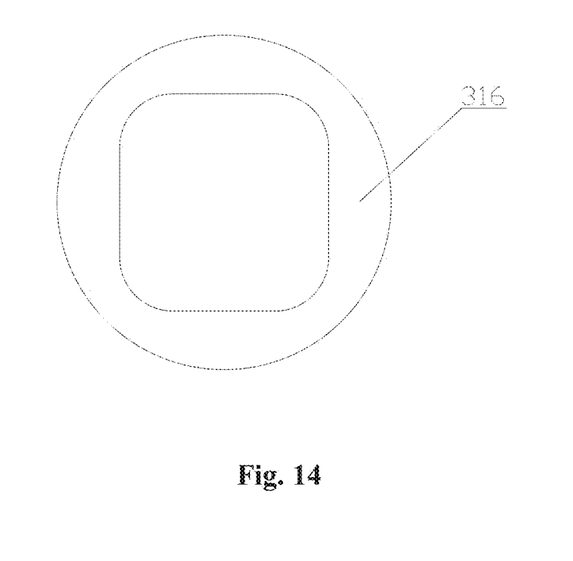
FIG. 14 is a schematic view showing the structure of a retainer ring.

As shown in FIG. 13, the small diameter cavity 31a of the upper valve seat 31 may have a circular cross section, and an annular groove is provided at a lower end of the cavity wall of the small diameter cavity 31a. The annular groove is provided therein with a retainer ring 316, and an inner hole of the retainer ring 316 is a non-circular hole. FIG. 14 shows a structure in which the inner hole of the retainer ring 316 is a square hole, and the small diameter segment 41a of the nut 41 has a cross section matching with the inner hole of the retainer ring 316, in this way, the circumferential rotation of the nut 41 is restricted.

Figure 10:
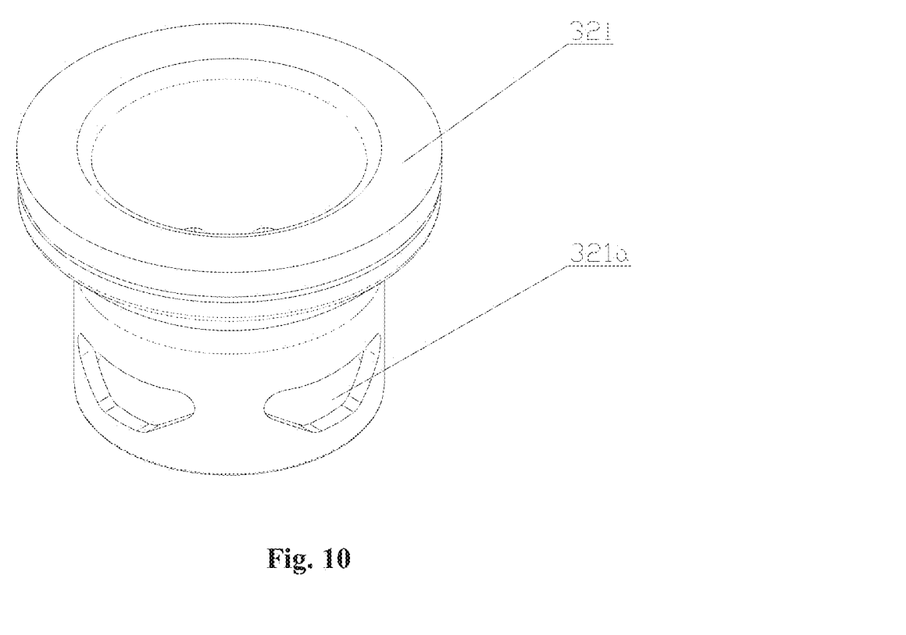
FIG. 10 is a schematic view showing the structure of a valve seat core in FIG. 1.
Figure 11:
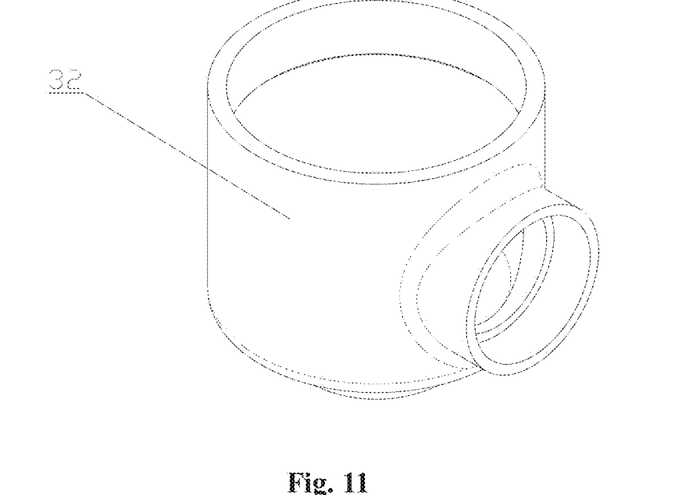
FIG. 11 is a schematic view showing the structure of a lower valve seat in FIG. 1.

Reference is made to FIGS. 10 to 11. FIG. 10 is a schematic view showing the structure of a valve seat core in FIG. 1. FIG. 11 is a schematic view showing the structure of a lower valve seat in FIG. 1.

The lower valve seat 32 is provided fixedly therein with a valve seat core 321, and the valve seat core 321 is provided with a core cavity, and a circumferential wall of the valve seat core 321 is provided with at least one flow regulating groove 321a. The valve seat core 321 separates the valve cavity into a first cavity and a second cavity surrounding the first cavity. Apparently, two cavities may be communicated with each other via the flow control valve 321a. It may be appreciated that, the first cavity is just the core cavity of the valve seat core 321, and the second cavity is in communication with a first connecting tube 322, and the first cavity is in communication with a second connecting tube 323 via the valve port 30a.

For the valve seat core 321 suffering a steady force during the flow of the refrigerant being adjusted, multiple flow control valves 321a may be distributed uniformly along the circumferential wall of the valve seat core 321.

Further, the flow regulating groove 321a may have a structure in which the circumferential length is tapered downwards in the axial direction of the valve seat core 321, as shown in FIG. 10. This structure allows the adjustment of the flow the refrigerant in a small flow range to be more precise. Apparently, in practical, the flow control valve 321a may be other structures, for example, a square structure, a circular structure, or an elliptical structure are also feasible, but the adjustment in a small flow range by these structures has a lower precision compared with the structure described above.

The valve core 42 connected to the nut 41 is provided in the valve cavity, specifically, in the first cavity. When the valve core 42 is in a fully closed state and the valve port 30a is closed, the side wall of the valve core 42 can block the flow regulating groove 321a, thus cutting off the communication of the first cavity and the second cavity. When the valve core 42 is moved upward by the nut 41, the flow control valve 321a is opened gradually, and the circulation area of the flow regulating groove 321a is changed, thus allowing the first cavity and the second cavity to be communicated, and the flow rate of the refrigerant to be adjusted. Apparently, a seal is required to be formed between the valve core 42 and the valve seat core 321.

Figure 3:
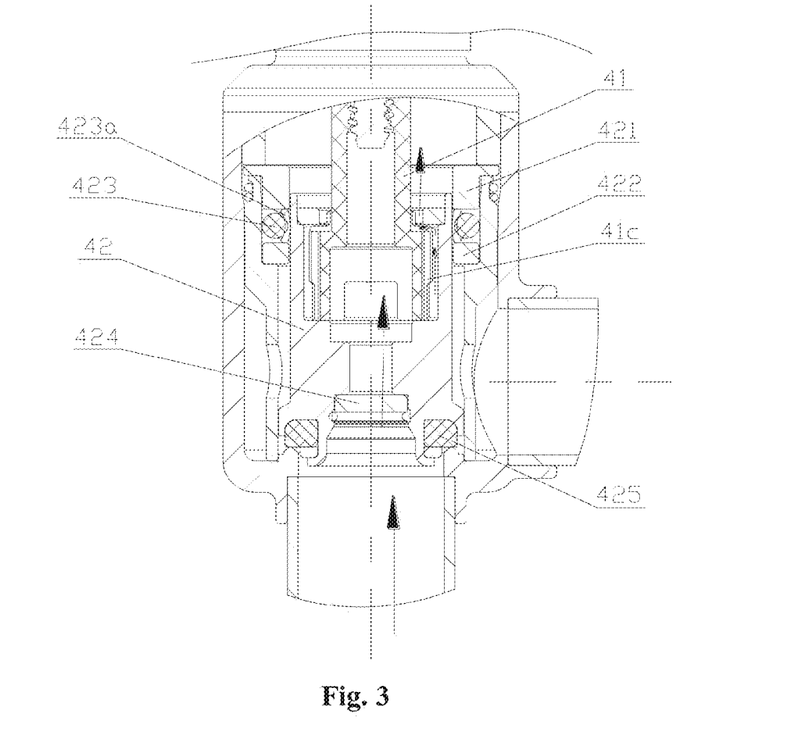
FIG. 3 shows the structure of an balancing passage of a valve core assembly in the case that the valve core is in a fully closed state.

It may be understood by reference to FIG. 3, specifically, a core cavity of the valve seat core 321 may be a stepped hole, and the stepped hole forms a stepped surface facing to the upper valve seat 31. An upper position-limiting sleeve 421 is inserted to an upper end of the valve seat core 321, and an upper end of the upper position-limiting sleeve 421 is provided with an annular radial boss. The radial boss is rested against an upper end surface of the valve seat core 42 facing to the upper valve seat 31. In this way, a lower end surface of the upper position-limiting sleeve 421, i.e., the end surface facing to the valve port 30a, the inner side wall of the valve seat core 12, and the stepped surface of the valve seat core 321 form a mounting groove, and a sealing gasket 423 may be mounted in the mounting groove.

Further, a lower position-limiting sleeve 422 may further be provided between the sealing gasket 423 and the stepped surface of the valve seat core 321. Since the valve core 42 is generally a structure which is small on an upper side and large on a lower side, which ensures the sealing to the valve port 30a. For meeting the assembling requirement of the valve core 42, an assembling gap is presented between a small diameter through hole of the valve seat core 321 and the valve core 42. The lower position-limiting sleeve 422 may prevent the sealing gasket 423 from being disengaged from the mounting groove in a reciprocating movement of the valve core due to the presence of the assembly gap.

Further, an outer circumferential surface of the sealing gasket 423 is provided with a sliding assist member 423a, and the sliding assist member 423a may be integrated with the sealing gasket 423, i.e., the sliding assist member 423a is wrapped over the circumferential surface of the sealing gasket 423, and may also be arranged independently. In the case that a pressure difference exists between the first cavity and the second cavity, the pressure squeezes the sealing gasket 423 to be deformed, and the sliding assist member 423a, for being wrapped over the circumferential surface of the sealing gasket 423, can conveniently suffer the squeezing force to the sealing gasket 423, thereby fitting against the outer circumferential wall of the valve core 42, which ensures the sealing, and at the same time, the sliding assist member 423a may further reduce the friction resistance of the valve core 42 when the valve core 42 moves axially.

The upper position-limiting sleeve 421 may further be required to be fixed with respect to the valve seat core 321. In this embodiment, an axial protrusion may be provided at the bottom of the large diameter segment of the upper valve seat 31, thereby forming an annular stepped surface facing to the lower valve seat 32. The upper valve seat 31 is inserted to the lower valve seat 32 via the axial protrusion, and an annular stepped surface of the upper valve seat 31 fits against an upper end surface of the lower valve seat 32, and a lower end of the axial protrusion presses the upper position-limiting sleeve 421 against the upper end surface of the valve seat core 321 tightly. Further, such structure of the upper valve seat 31 may also easily ensures the coaxiality of the upper valve seat 31 and the lower valve seat 32. Apparently, the upper position-limiting sleeve 421 and the valve seat core 321 may be fixed by other manners, for example by welding, or threaded connection.

In the case that the valve core 42 is in the fully closed state, the sealing of the valve core 42 and the valve port 30a may also should be ensured.

In this embodiment, a bottom end of the valve core 42 is provided with an axial protrusion, and a sealing ring 425 is riveted onto the axial protrusion. In the case that the valve core 42 is in the fully closed state, a lower end surface of the sealing ring 425 fits against the valve port 30a to form a seal. Apparently, the diameter at an outer end of the sealing ring 425 is larger than the diameter of the valve port 30a.

Further, the rotor 12 of the motor 10 of the direct-acting electric valve is a permanent magnet rotor, specifically, the rotor 12 may be made of a material of Neodymium-Iron-Boron (NdFeB) magnetic steel or anisotropic ferrite. In this way, when the valve core 42 is in the fully closed state, the motor 10 is de-energized, and since the rotor 12 is the permanent magnet rotor, the motor 10 has a positioning torque in a de-energized state, which can hold a relative position between the screw rod 312 and the nut 41, preventing the screw rod 312 from sliding away the nut 41. Thus, in the de-energized state of the motor 10, the sealing between the valve core 42 and the valve port 30a is further ensured, and the inner leakage is avoided.

The ratio of an outer diameter of the rotor 12 to the diameter of the valve port 30a preferably ranges from 0.8 to 1.8 in order to allow the motor 10 to have a certain positioning toque.

Further, the valve core 42 has an axial through hole in communication with the receiving cavity, and a circumferential wall of the nut 41 is provided with a vent groove 41c, i.e., the balancing passage of the valve core 42 includes the receiving cavity, the axial through hole in communication with the receiving cavity, and the vent groove 41c arranged in the circumferential wall of the nut 41. In this way, in the case that the valve core 42 is in the fully closed state, the pressures at an upper end and a lower end of the valve core 42 are balanced, which can be understood by reference to FIG. 3. FIG. 3 is a schematic view showing the structure in which the upper pressure and the lower pressure of the valve core assembly are balanced in the state that the valve port is in the fully closed state. As shown by the arrows in the drawing, the second connecting tube 323 is in communication with the axial through hole of the valve core 42 via the valve port 30a, and is in communication with the large diameter cavity 31b of the upper valve seat 31 via the vent groove 41c of the nut 41, and the pressure difference suffered by the valve core 42 is small. Only a small driving force is required when opening the valve port 30a, i.e., a small motor 10 may power a large valve core 42, thus further minimizing the direct-acting electric valve.

Further, an annular groove is provided at a lower end of an inner wall of the axial through hole of the valve core 42, and a sieve 424 is provided in the annular groove. The sieve 424 avoids the screw threads, through which the screw rod 312 and the nut 41 are cooperated, from being stuck due to a foreign substance brought into the axial through hole of the valve core 42 when the refrigerant flows.

In addition, a stepped end surface 31c facing to the valve port 30a is formed at an area where the small diameter cavity 31a and the large diameter cavity 31b of the lower cavity of the upper valve seat 31 of the direct-acting electric valve are communicated, and the distance between the stepped end surface 31c and the valve port 30a restricts an axial moving distance of the valve core 42. As shown in FIG. 1, in the case that the valve core 42 is in the fully opened state, the flow control valve 321a is fully opened, and the first connecting tube 322 is in communication with the second connecting tube 323 via the flow regulating groove 321a, at this time, an upper end surface of the valve core 42 abuts against the stepped end surface 31c. As shown in FIG. 2, in the case that the valve core 42 is in the fully closed state, the sealing ring 425 of the valve core 42 fits against the valve port 30a to form a seal, and the first connecting tube 322 and the second connecting tube 323 are not communicated, and the communication of the refrigerant is fully cut off.

The direct-acting electric valve can achieve bi-directional flow, which can be understood by reference to FIGS. 1 and 2. Arrows in FIGS. 1 and 2 represent the flow direction of the refrigerant. The solid arrow indicates that the refrigerant enters from the first connecting tube 322, and flows out of the second connecting tube 323, and the dotted arrow indicates that the refrigerant enters from the second connecting tube 323 and flows out of the first connecting tube 322.

Figure 15:
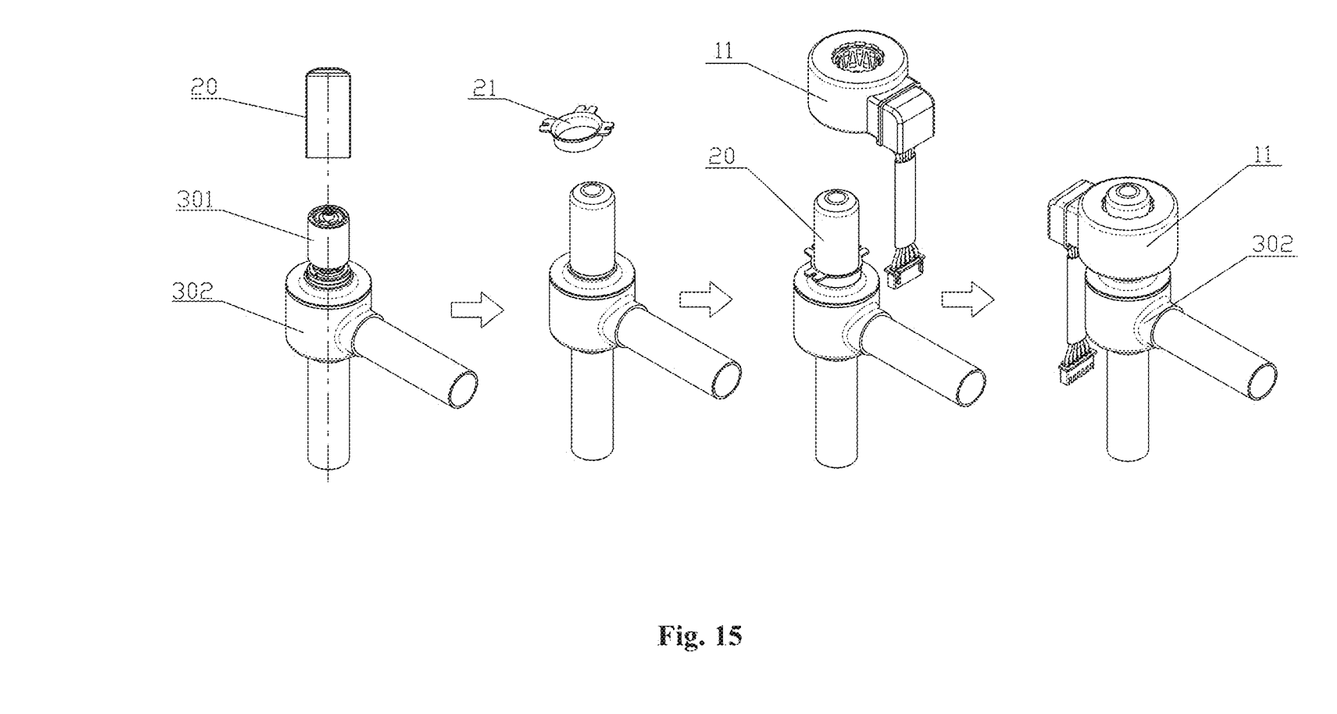
FIG. 15 shows a schematic flow chart of assembling a direct-acting electric valve.

FIG. 15 shows a schematic flow chart of assembling a direct-acting electric valve. The assembling method for the direct-acting electric valve includes the following steps:

mounting an assembled valve core assembly 400 to an assembled lower valve seat assembly 302;

screwing a screw rod 312 of an assembled upper valve seat assembly 301 into a nut 41 of the valve core assembly 400, and fixing an upper valve seat 31 of the upper valve seat assembly 301 to a lower valve seat 32 of the lower valve seat assembly 302 by welding; and mounting a housing 20 and a fixing rest 21 by pressing, and assembling a coil component 11 of a motor 10.

Figure 16:
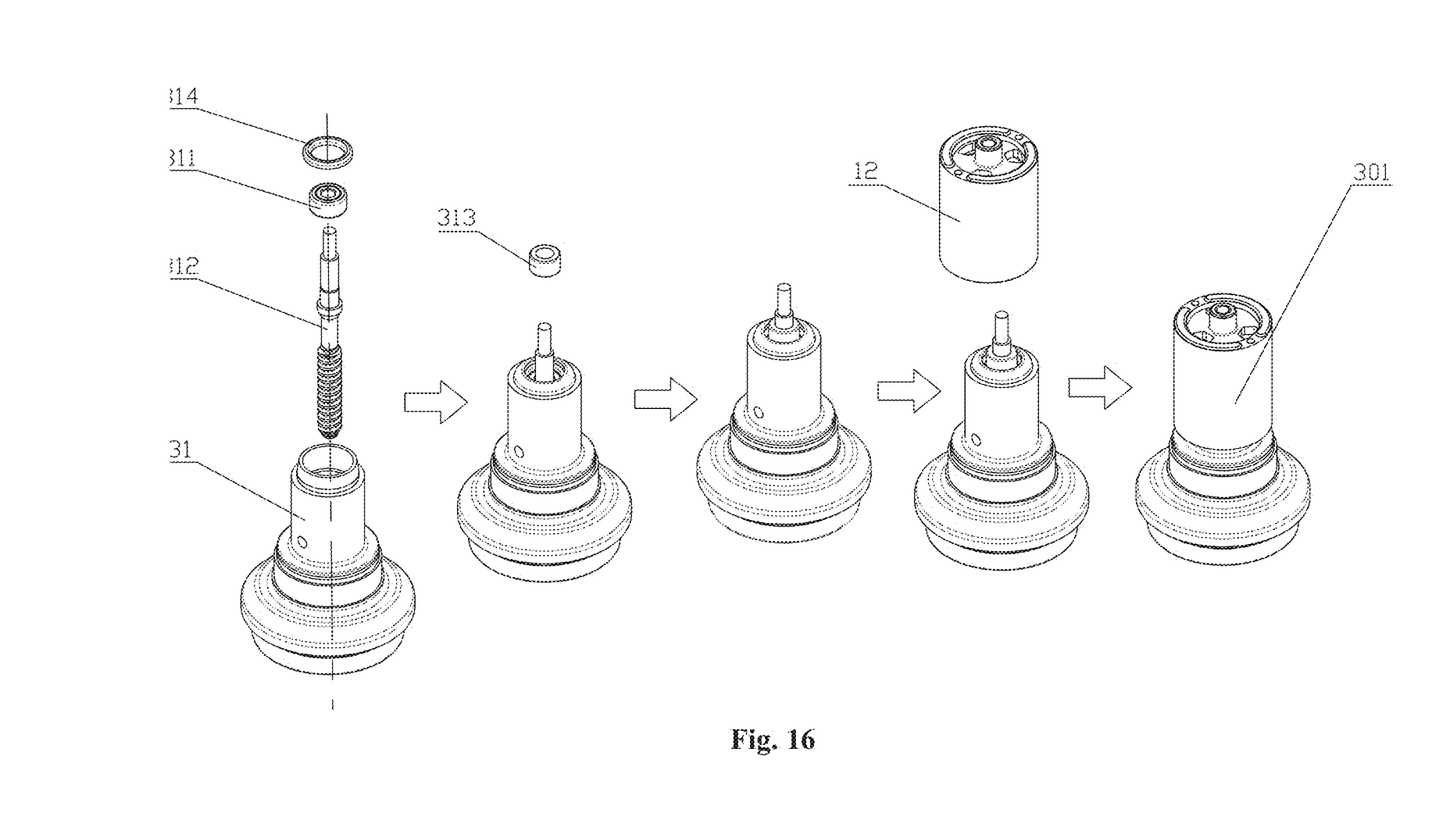
FIG. 16 shows a schematic flow chart of assembling an upper valve seat assembly.

Reference for the assembling flow chart of the upper valve seat assembly 301 is made to FIG. 16. The following steps are included:

mounting a screw rod 312, a bearing 311 and an upper valve seat 31 by pressing;

mounting a spacer 314 to an upper end of the bearing 311, and riveting or welding the spacer 314 to the upper valve seat 31;

clamping a bush 313 between the screw rod 312 and the spacer 314, which allows the bush 313 to abut against an upper end of the bearing 311 and be fixed to the screw rod 312 by welding; and sleeving a rotor 12 of a motor 10 on an upper end of the upper valve seat 31, and fixedly connecting the rotor 12 of the motor 10 to the screw rod 312.

Figure 17:
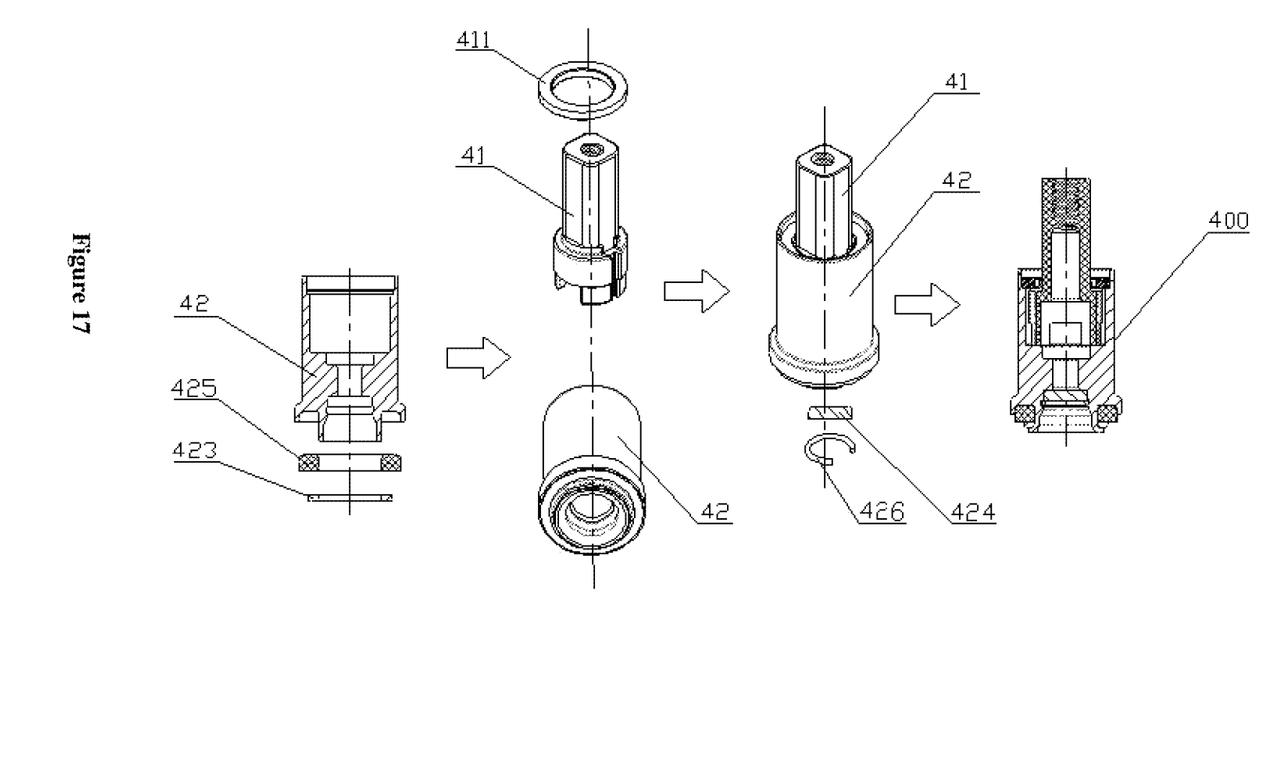
FIG. 17 shows a schematic flow chart of assembling a valve core assembly.

Reference for the assembling flow chart of the valve core assembly 400 is made to FIG. 17. The following steps are included:

riveting a sealing ring 422 and a gasket 423 to an axial protrusion at a bottom end of the valve core 42;

mounting a large diameter portion 41b of the nut 41 to a receiving cavity of the valve core 42 by pressing;

fixing the nut cover plate 411 to the valve core 42 by welding; and assembling a sieve 424 and a clamping spring 425.

The direct-acting electric valve according to the present application employs the above assembling method for the direct-acting electric valve. Since the above direct-acting electric valve has the above technical effects, the assembling method for assembling the direct-acting electric valve should also have corresponding technical effects, which is not described here.

The flow control valve according to the present application is described in detail hereinbefore. In the description, specific examples are used in the description of the principle and embodiments of the present application. It is noted that the examples and the embodiments are only for better understanding of the method and concept of the present application. It should be noted that, various improvements and modifications can be made by those skilled in the art without departing from the principle of the present application, which also fall within the scope of protection defined by the claims.

The invention claimed is:

1. An assembling method for a direct-acting electric valve, comprising steps:

mounting an assembled valve core assembly to an assembled lower valve seat assembly;

screwing a screw rod of an assembled upper valve seat assembly into a nut of the valve core assembly, and fixing an upper valve seat of the upper valve seat assembly to a lower valve seat of the lower valve seat assembly by welding; and mounting a housing and a fixing rest by pressing, and assembling a coil component of a motor, wherein the assembling of the upper valve seat assembly comprises:

mounting the screw rod, a bearing and an upper valve seat by pressing;

mounting a spacer to an upper end of the bearing, and riveting or welding the spacer to the upper valve seat;

clamping a bush between the screw rod and the spacer, which allows the bush to abut against an upper end of the bearing and be fixed to the screw rod by welding; and sleeving a rotor of a motor on an upper end of the upper valve seat, and fixedly connecting the rotor of the motor to the screw rod.

\* \* \* \* \*

UNITED STATES PATENT AND TRADEMARK OFFICE
CERTIFICATE OF CORRECTION

PATENT NO. : 10,352,467 B2
APPLICATION NO. : 14/917254
DATED : July 16, 2019
INVENTOR(S) : Ming Lv et al.

Page 1 of 1

It is certified that error appears in the above-identified patent and that said Letters Patent is hereby corrected as shown below:

In the Specification

At Column 1, Lines 5-14, please insert the following paragraph:
--This application is the National Phase of PCT Application No. PCT/CN2015/071065, filed January 20, 2015, which application claims the priority benefit of Chinese Patent Application No. 201410026132.1 titled "DIRECT-ACTING ELECTRIC VALVE", filed with the Chinese State Intellectual Property Office on January 20, 2014, and Chinese Patent Application No. 201410025331.0 titled "DIRECT-ACTING ELECTRIC VALVE AND ASSEMBLY METHOD THEREFOR", filed with the Chinese State Intellectual Property Office on January 20, 2014, both of which applications are hereby incorporated by reference to the maximum extent allowable by law.--

Signed and Sealed this
Seventeenth Day of September, 2019

Andrei Iancu
*Director of the United States Patent and Trademark Office*